United States Patent
Kyrtsos et al.

(10) Patent No.: US 7,599,812 B2
(45) Date of Patent: Oct. 6, 2009

(54) OUTSIDE AMBIENT TEMPERATURE INITIALIZATION TECHNIQUE

(75) Inventors: Christos Kyrtsos, Southfield, MI (US); Kenneth Gerard Brown, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/869,989

(22) Filed: Oct. 10, 2007

(65) Prior Publication Data

US 2009/0099804 A1    Apr. 16, 2009

(51) Int. Cl.
*G01K 5/00* (2006.01)
*G01K 7/00* (2006.01)
*G01K 11/00* (2006.01)
*G01K 15/00* (2006.01)

(52) U.S. Cl. .......................... 702/130; 702/99
(58) Field of Classification Search .............. 702/99, 702/130, 132, 134, 136; 374/100, 110, 134, 374/144–146
See application file for complete search history.

(56) References Cited

U.S. PATENT DOCUMENTS

| | | | |
|---|---|---|---|
| 5,001,656 A | 3/1991 | Zimmerman et al. | |
| 5,416,728 A | 5/1995 | Rudzewicz et al. | |
| 5,895,117 A | 4/1999 | Wuertenberger | |
| 6,665,629 B2 | 12/2003 | Manakkal et al. | |
| 6,725,710 B2 * | 4/2004 | Oka et al. | 73/114.68 |
| 6,745,582 B1 | 6/2004 | Urbank et al. | |
| 6,974,251 B2 | 12/2005 | DeRonne et al. | |
| 7,387,437 B2 * | 6/2008 | Brown et al. | 374/141 |
| 2003/0115012 A1 * | 6/2003 | Manakkal et al. | 702/130 |
| 2006/0209921 A1 | 9/2006 | Brown et al. | |
| 2006/0235639 A1 * | 10/2006 | Piazza | 702/130 |

* cited by examiner

*Primary Examiner*—Michael P Nghiem
(74) *Attorney, Agent, or Firm*—Raymond L. Coppiellie; Brooks Kushman P.C.

(57) ABSTRACT

A method of determining air temperature outside a passenger compartment of a motor vehicle, the motor vehicle having an engine and an outside air temperature (OAT) sensor disposed outside the passenger compartment. The OAT sensor is located in a region which is exposed to heat after the engine is turned off. The method includes measuring a series of temperature values at the OAT sensor, using the measured OAT sensor values to develop a temperature-time function, and generating an adjusted OAT value using an observed time, the measured OAT sensor values, and the temperature-time function.

20 Claims, 7 Drawing Sheets

OUTSIDE AMBIENT TEMPERATURE INITIALIZATION TECHNIQUE

BACKGROUND OF THE INVENTION

1. Field of the Invention

The present invention relates to a technique for determining ambient air temperature outside a passenger compartment of a vehicle, and more specifically to a technique for determining ambient air temperature in the presence of undesired heat load adjacent to the sensor.

2. Background Art

Outside ambient temperature (OAT) sensors are used in vehicles to measure the temperature of ambient air near the OAT sensor. Such OAT sensors are commonly used for climate control as well as for other vehicle functions. For example, OAT sensor readings may be used as an input to a vehicle climate control system for controlling the temperature within the passenger cabin of the vehicle.

However, OAT sensors—when positioned near heat-radiating vehicle components, such as a radiator or an engine block—can produce inaccurate temperature readings when the vehicle is shut off and air is not flowing past the OAT sensor. The worst case for this situation occurs in the summer months when the engine does not cool down as quickly as during other seasons. As a result, when the vehicle is turned off and then back on within a few hours, the sensor produces higher temperature values than the actual ambient temperature.

Previous methods for overcoming erroneous OAT temperature readings have relied on measuring the engine coolant temperature upon vehicle start-up to determine coolant temperature deviation from an expected value with respect to time. The problem with this technique is that vehicles dissipate heat at different rates depending on the vehicle's parking location and parking time duration, among other factors. Hence, for such a vehicle that is turned off and on within a short period of time, the outside ambient temperature reading could conceivably display a much higher temperature than actual. During warmer times of the year, this could cause the air conditioning of an automatic climate control system to erroneously turn on at the highest setting, causing customer dissatisfaction.

Accordingly, what is needed is an improved outside ambient temperature start-up method to reliably calculate an outside ambient temperature value in the presence of undesirable heating effects on the OAT sensor.

SUMMARY OF THE INVENTION

According to one aspect of the invention, a method is provided for determining air temperature outside a passenger compartment of a motor vehicle, in which the motor vehicle has an engine and an outside air temperature (OAT) sensor disposed outside the passenger compartment. The OAT sensor is located in a region which is exposed to heat after the engine is turned off. The method comprises measuring the temperature at the OAT sensor over a series of spaced apart time intervals to define a plurality of measured OAT sensor values, at least one of which is after the engine is turned off. The method further includes using the measured OAT sensor values to develop a temperature-time function, and generating an adjusted OAT value using an observed time, the measured OAT sensor values, and the temperature-time function.

According to another aspect of the invention, a system is provided for determining air temperature outside a passenger compartment of a motor vehicle. The system comprises a motor vehicle having a passenger compartment, an engine, and an outside air temperature (OAT) sensor disposed outside the passenger compartment. The OAT sensor is in a region which is exposed to heat after the engine is turned off. The system further includes a controller having a computer readable medium. The controller includes multiple instructions encoded on the computer readable medium. One instruction is for measuring the temperature at the OAT sensor over a series of spaced apart time intervals to define a plurality of measured OAT sensor values, at least one of which is after the engine is turned off. Another instruction provides for using the measured OAT sensor values to develop a temperature-time function. Yet another instruction allows for generating an adjusted OAT value using an observed time, the measured OAT sensor values, and the temperature-time function.

DETAILED DESCRIPTION OF THE PREFERRED EMBODIMENT(S)

Figure 1:
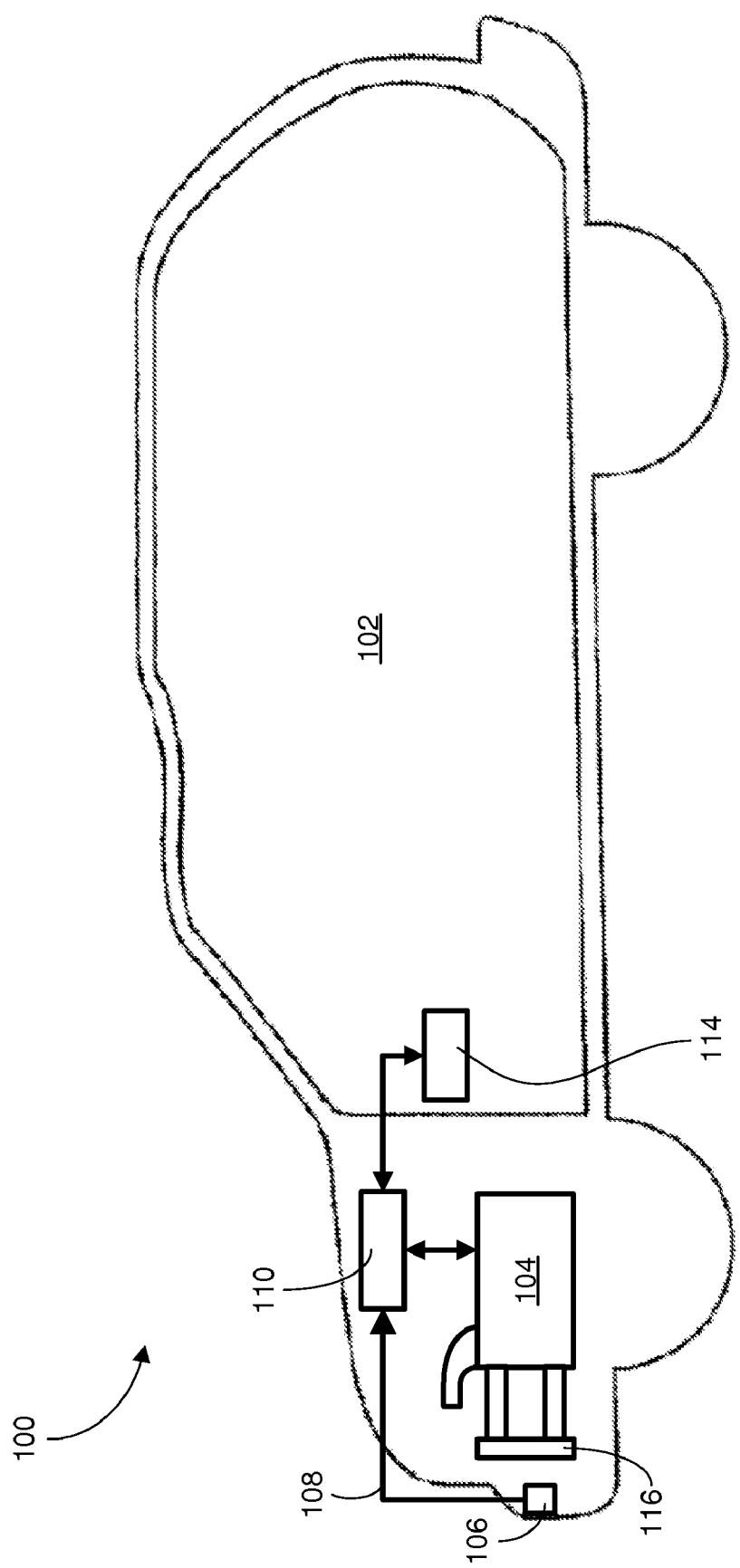
FIG. 1 shows a vehicle in which embodiments of the present invention may operate.

FIG. 1 shows a vehicle 100 having an interior passenger cabin 102 and an engine 104. The vehicle 100 also has an outside ambient temperature (OAT) sensor 106 for measuring the air temperature outside the passenger cabin 102. As one skilled in the art will recognize, the present invention is quite suitable to accommodate a vehicle 100 and engine 104 of any type and size.

The OAT sensor 106 is disposed outside the passenger cabin 102 and may output a signal 108 to an engine control unit (ECU) 110. The ECU 110 may communicate with a climate controller 114 to provide signals to the climate controller 114, such as the signal 108 received from the OAT sensor 106. Although climate controller 114 is shown to be located within the passenger cabin 102, the vehicle 100 can be readily configured to accommodate the climate controller 114 outside of the passenger cabin 102.

The vehicle 100 may also have a radiator 116 in close proximity to the OAT sensor 106 for dissipating engine heat to the atmosphere. As previously discussed, the radiator 116 and the engine 104, among other vehicle components, can radiate undesired heat to the OAT sensor 106, rendering the sensor's temperature readings inaccurate when the vehicle is shut off and air is not flowing past the OAT sensor 108.

Figure 2A:
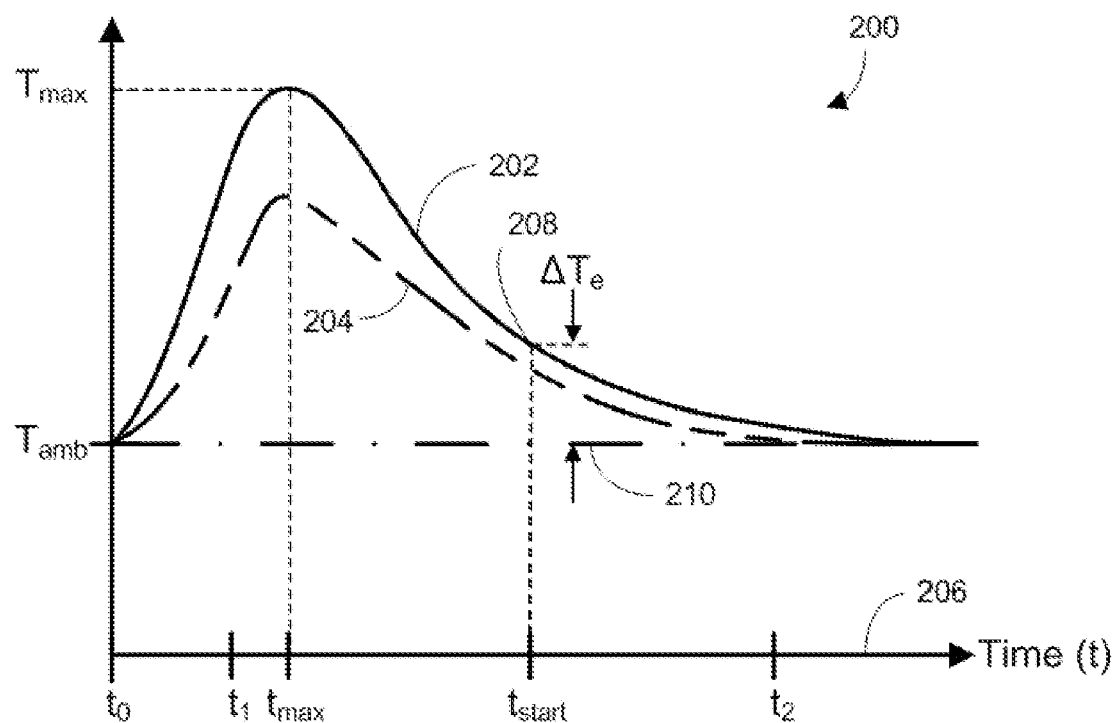
FIGS. 2A-2B show temperature-versus-time graphs of an outside ambient temperature (OAT) sensor output in accordance with embodiments of the present invention.

Referring now to FIG. 2A, a temperature-versus-time graph 200 shows temperature readings from an OAT sensor which is exposed to heat after the engine is turned off. Graph 200 shows two curves, 202 and 204, each curve showing the behavior of temperature at the OAT sensor in a different scenario. Temperature curve 202 corresponds to a scenario in which a vehicle accumulates higher temperature values around the sensor than curve 204 following engine shut-off.

For example, the vehicle corresponding to curve 202 may be parked outside on a sunny day or in a hot parking structure sheltered from the wind. Alternatively, curve 204 may have a lower peak temperature as a result of the engine not reaching full operating temperature such as after a short drive. To focus the discussion, exclusive attention is given to curve 202 in the following disclosure.

Curve 202 reaches a maximum temperature value at time $t_{max}$. For times after $t_{max}$, the temperature gradually drops as heat is dissipated. As time increases, curve 202 approaches an ambient temperature value $T_{amb}$. Note that graph 200 shows a scenario having a relatively time constant outside ambient temperature value. Time varying ambient temperature is discussed in the following disclosure relating to FIG. 2B.

Several time values are shown along the horizontal axis 206 of graph 200. Time $t_0$ is the engine shut off time, $t_1$ is a lower threshold time, and $t_2$ is an upper threshold time. A vehicle operator may restart his or her vehicle within a number of time spans. When starting the vehicle before the lower threshold time $t_1$, the temperature value on curve 202 corresponding to the start time is relatively similar to the ambient temperature value $T_{amb}$. The corrected ambient temperature value may therefore be set to the corresponding measured value without introducing a significant error.

When starting the vehicle between threshold times $t_1$ and $t_2$, the measured temperature value on curve 202 corresponding to the start time deviates significantly from the ambient temperature value $T_{amb}$. Assuming the vehicle is started in this time span, a number of methods, in accordance with embodiments of the present invention, may be used to determine the correct outside ambient temperature at vehicle start-up.

To better illustrate the scenario where the vehicle is started between $t_1$ and $t_2$, time $t_{start}$ is shown in an arbitrarily chosen location in this time span. Note that at $t_{start}$ an error $\Delta T_e$ exists between the measured value 208 and the actual ambient temperature value 210. To correct this error $\Delta T_e$, a variation of the invention provides for using a data set, the data points of which are collected in spaced apart intervals from engine shut-off time $t_0$ to engine start-up time $t_{start}$. Alternatively, a temperature value taken some time prior to engine shut off can be used as the $t_0$ value in the temperature time calculation. Then, using any suitable extrapolation method, the data set can be projected forward until a stable ambient temperature value is determined. The corrected ambient temperature value at time $t_{start}$ can then be set to the stable temperature value. A stable temperature value could, for example, be a value averaged from a set of consecutive projected values which do not significantly increase or decrease over time.

As previously mentioned, any suitable extrapolation method, linear or non-linear, may be used to project the measured data set. Based on the extrapolation, any suitable correction equation may be used to determine the corrected ambient temperature at time $t_{start}$, for example the following non-linear equation:

$$T_{corr}=A*e^{-(B*t)}+C,$$

where $T_{corr}$ is the corrected ambient temperature at time t and A, B, and C are constant values determined from the extrapolation. One skilled in the art will recognize that a number of extrapolation methods and correction equations may be used alone or in combination to determine the corrected ambient temperature associated with the engine start time.

Another variation of the invention provides for comparing a set of data points taken between engine shut-down $t_0$ and engine start-up ($t_{start}$) to a predefined look-up table. The look-up table may be modeled with respect to a particular vehicle and may include threshold time values $t_1$ and $t_2$ and maximum temperature time $T_{max}$. The look-up table may model a curve characterizing temperature behavior at the OAT sensor, similar to the exemplarily shown curves 202 and 204. The measured data set may then be compared to the look-up table data set to determine the corrected outside ambient temperature at $t_{start}$. For example, the following equation may be used to determine the corrected ambient temperature at $t_{start}$:

$$T_{corr}=k*T_{meas}+T_0,$$

where $T_{corr}$ is the corrected ambient temperature at time $t_{start}$, $T_{meas}$ is the measured temperature at $t_{start}$, k is a multiplicity factor defining a relationship between the measured data set and the look-up table data set, and $T_0$ is the initial ambient temperature taken at engine shut-off $t_0$. One skilled in the art will recognize that, along with the previously discussed OAT correction variations, a number of other suitable methods may be used to calculate the outside ambient temperature for an engine-start time between times $t_1$ and $t_2$.

A vehicle operator may alternatively start the engine at a time after $t_2$. Note that for curve 202, the temperature value is relatively similar to the ambient temperature value $T_{amb}$. For a vehicle started on or after $t_2$, the corrected ambient temperature value may be set to the measured reading at the engine start time $t_{start}$ without significantly deviating from the actual ambient temperature value $T_{amb}$.

Figure 2B:
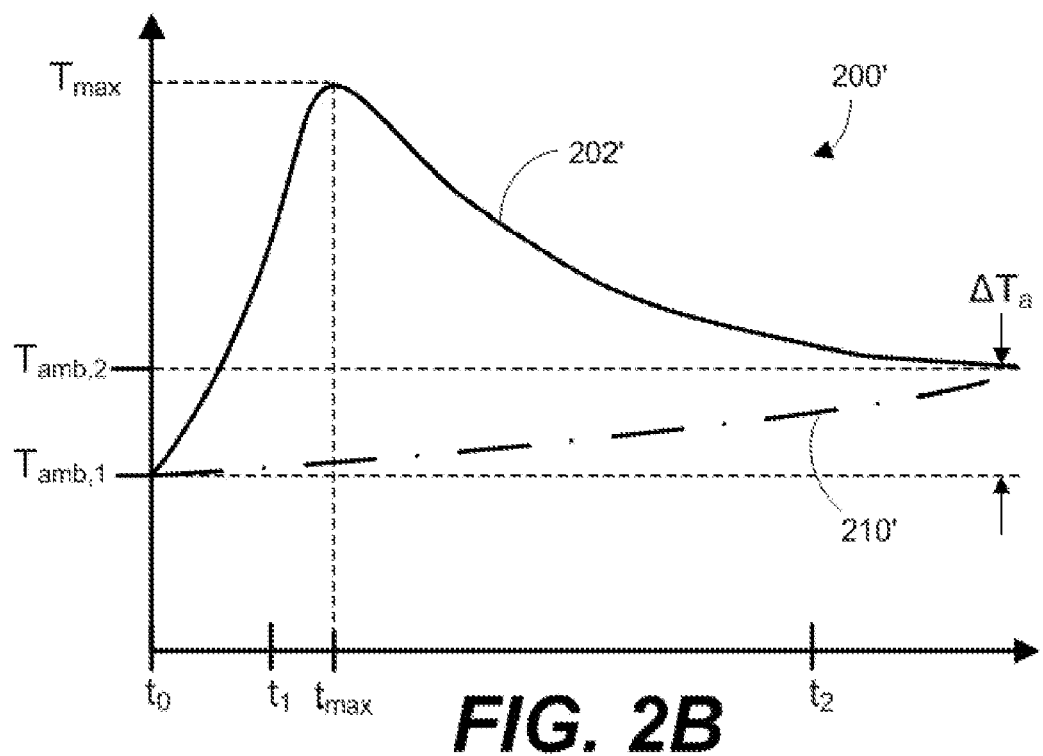

Referring now to FIG. 2B, a similar temperature-versus-time graph 200' is shown having a temperature curve 202' composed of temperature values measured at the OAT sensor. As shown, the measured values increase with increasing time. In a similar fashion to the curves 202 and 204 of FIG. 2A, the temperature values in curve 202' increase from an engine shut-off time $t_0$ to a maximum value $T_{max}$ at time $t_{max}$ and begin to gradually decrease from $T_{max}$ with increasing time. Note that in graph 200' the ambient temperature 210' gradually increases over time. Such a variation in ambient temperature could be attributed to changing temperature throughout the day. Assuming the vehicle is started at a time between $t_1$ and $t_2$, a time varying error is defined between the measured temperature value and the ambient temperature value. Any suitable calculation method, including those discussed previously with regard to FIG. 2A, may be used to calculate the corrected ambient temperature value at the vehicle start time ($t_{START}$) with respect to the time-varying ambient air temperature.

Figure 3:
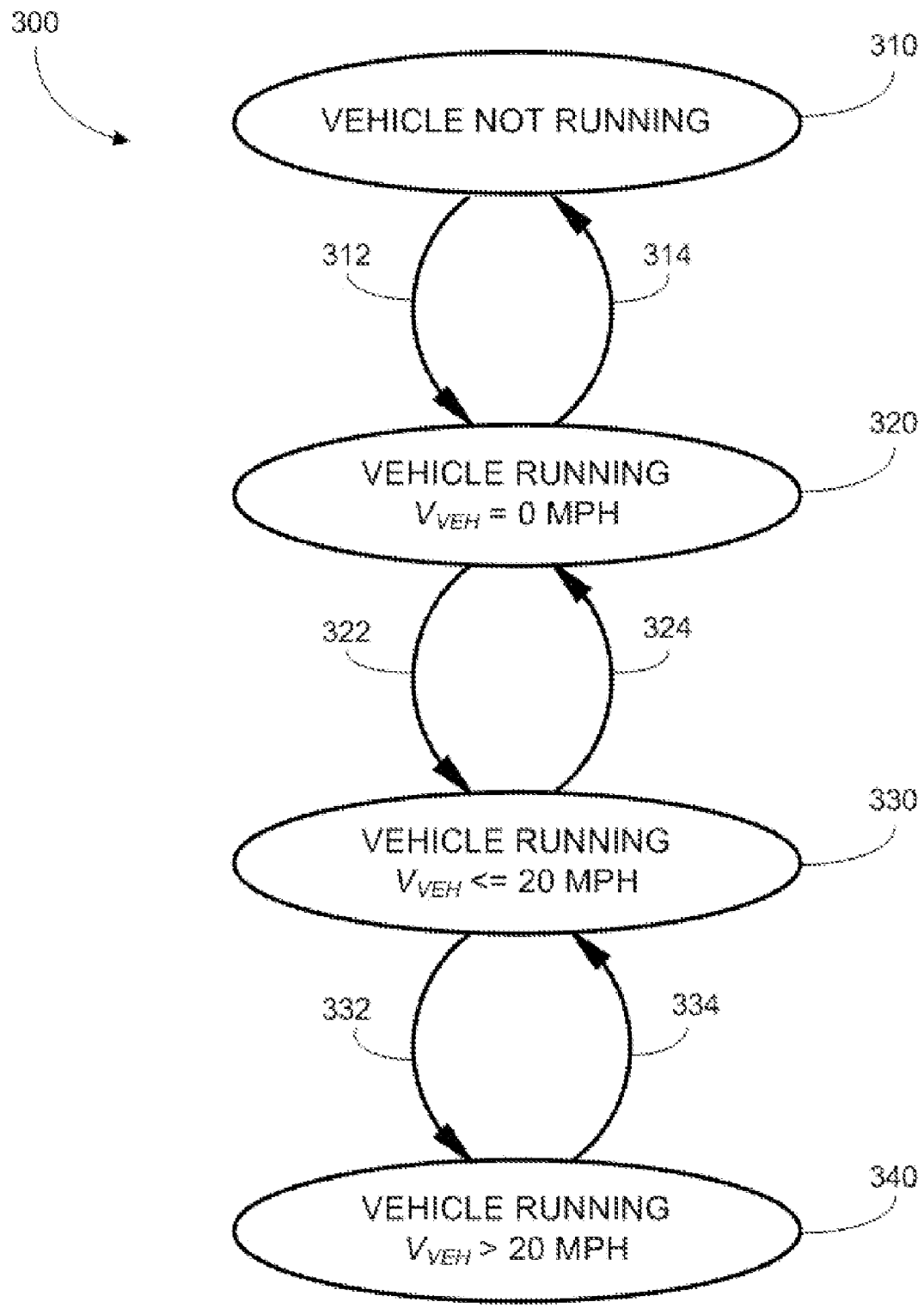
FIG. 3 shows a state diagram in accordance with embodiments of the present invention.

FIGS. 3-7 show an exemplary method of determining and correcting outside ambient air temperature in accordance with embodiments of the present invention. Referring to FIG. 3, state diagram 300 shows states 310, 320, 330 and 340 in which a vehicle may operate. As shown by element 310, the vehicle is in an off state; that is, a state in which the vehicle is parked and the engine is turned off. When the engine is turned on, the vehicle transitions to state 320 via 312. Likewise, when the engine is turned off, the vehicle transitions to state 310 via 314. When in motion, the vehicle enters state 330 via 322. Reciprocally, parking the vehicle or slowing down to a stop transitions the vehicle to state 320 via 324. A threshold speed value, arbitrarily shown as 20 MPH in states 330 and 340, enables the transition between state 330 and state 340. The threshold speed may be any suitable speed value and may further be dictated by the type and size of the particular vehicle and/or engine. Although not shown, state diagram 300 may have one or more additional states to allow for multiple threshold speed values.

Figure 4:
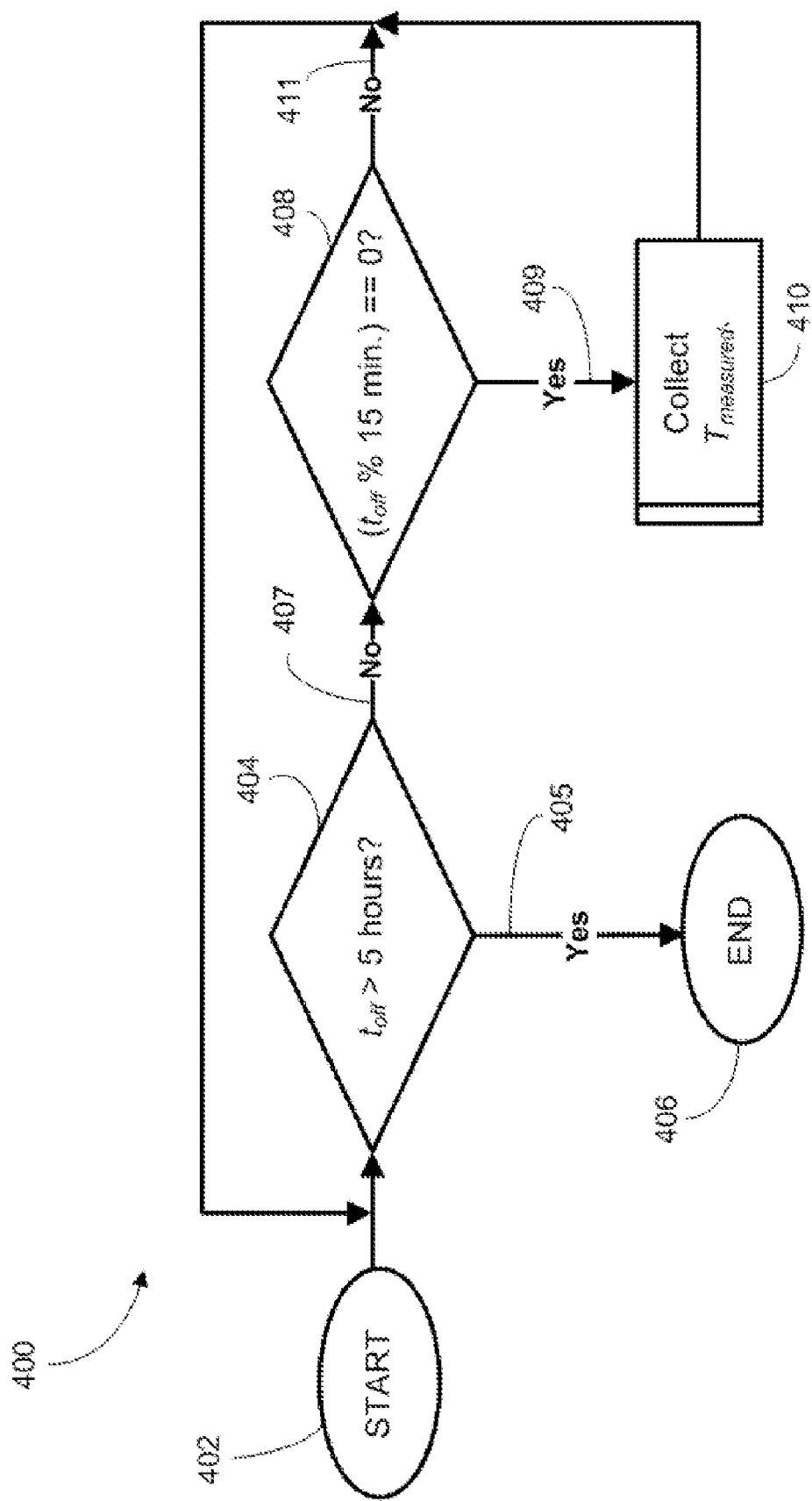
FIGS. 4-7 show flow diagrams illustrating methods for determining and correcting vehicle ambient temperature in accordance with embodiments of the present invention.

Referring to FIG. 4, the method of flow chart 400 corresponds to state 310 of FIG. 3 and may operate while the vehicle is parked or stopped. The method of 400 begins at block 402 and proceeds to decision block 404. At 404, a determination is made as to whether or not the engine off time duration exceeds a predetermined time value. The predetermined time value may vary depending on the type and size of the vehicle and/or engine and may therefore vary from vehicle to vehicle. Diverting briefly to FIG. 2A, the predetermined time may correspond to time $t_2$. If the engine off time duration exceeds the predetermined time value, the method of 400 ends at block 406 via path 405.

Otherwise, path 407 is followed to block 408, where it is determined whether or not a sampling interval has passed. A sampling interval may be a time interval of any suitable time duration between consecutive samples. An arbitrarily chosen sampling interval of fifteen minutes is shown in block 408. In this case, every fifteenth minute, the method would proceed to block 410. Otherwise, path 411 is followed to return to block 404. Of course, path 411, along with the other paths, can include a time delay of any suitable length to allow for an increased sampling time.

At block 410, an ambient temperature reading is collected. The collected temperature reading is preferably stored to a computer readable medium of a controller, such as a climate controller. However, the collected reading may be stored to any other suitable computer readable medium as dictated by the particular vehicle. Following block 410, the method of 400 proceeds via path 411 to decision block 404. Note that the method continues in this fashion until either the engine off time duration exceeds the predetermined time, as shown in element 404, or, alternatively, when the vehicle state changes.

Figure 5:
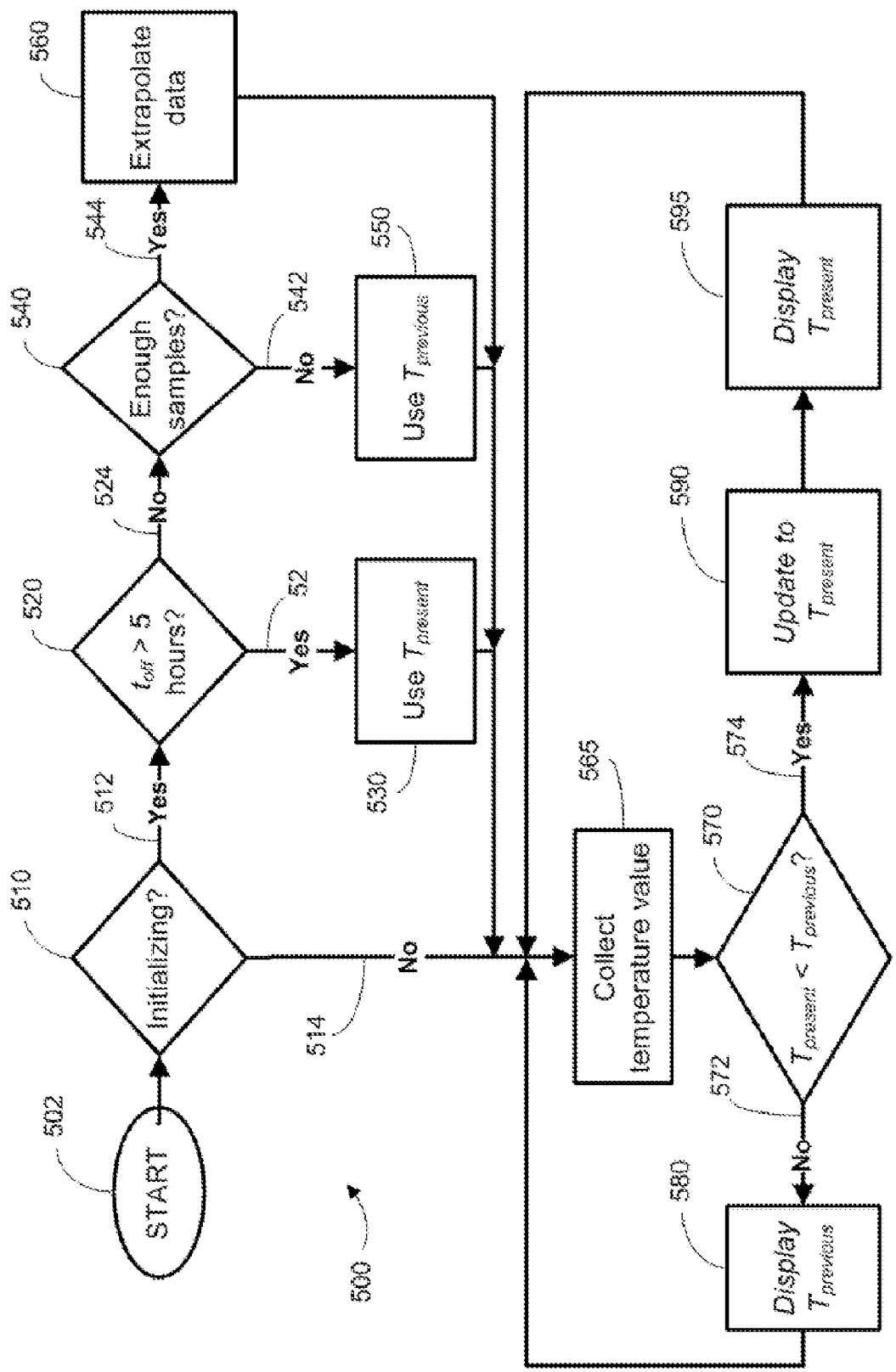

Referring to FIG. 5, the method of flow chart 500 corresponds to state 320 in FIG. 3 and may accordingly be implemented when the engine is turned on. The method of 500 begins at 502 and proceeds to decision element 510 where a determination is made as to whether or not the climate controller is initializing. The climate controller initializes upon start-up of a vehicle to, among other things, calculate the start-up ambient temperature value and optionally communicate the start-up value with other controllers, such as the engine control unit. If the climate controller is initializing, the method follows path 512 to decision element 520 where it is determined whether or not the engine off duration exceeds a predetermined time. A five hour time duration has been arbitrarily chosen to represent the predetermined time. However, any suitable predetermined time may be used as dictated, among other factors, by the type and size of the vehicle and/or engine, and can be determined experimentally.

In this case, if the engine off duration exceeds five hours, the method proceeds to element 530 via path 522 where the corrected ambient temperature value is set to the most recent reading taken by the OAT sensor. As discussed earlier, with respect to FIGS. 2A-2B, when the time duration following the engine off time exceeds a threshold time ($t_2$ as shown in FIGS. 2A-2B), the most recent measured temperature value is within an acceptable range of the actual ambient temperature value and may accordingly be used for the corrected ambient temperature value.

Referring back to FIG. 5, if the engine off time does not exceed the predetermined time, the method of 500 proceeds to decision block 540 via path 524 where the number of outside ambient temperature sensor readings are queried. If the number of readings exceeds a sufficient predetermined number of samples, the method proceeds to element 560 via path 544. At 560, the measured ambient temperature values are extrapolated to calculate a corrected ambient temperature value. The measured values may be extrapolated in any suitable manner using a linear or non-linear extrapolation. Any of the methods discussed with regard to FIGS. 2A-2B, in addition to any other suitable calculation method, may be used to calculate the corrected ambient temperature value alone or in combination.

Referring back to decision block 540, if a sufficient number of readings are not available, the method proceeds to block 550 via path 542 where a previous temperature value is used for the corrected ambient temperature value. Additionally, a diagnostic fault code may be stored to the climate controller or to the ECU to suitably handle the error condition, perhaps by prevent a climate control system, if the vehicle is equipped with such a system, from operating at a highest setting for a predetermined period of time to enable the system to start gradually. One skilled in the art will recognize that such a diagnostic code can additionally serve a variety of purposes, such as logging fault occurrences for scheduled maintenance visits.

With continued reference to FIG. 5, following block 550, an ambient temperature measurement is collected via OAT sensor at block 565. Next, at decision block 570, the stored ambient temperature value is compared to the collected ambient temperature value. The stored value may be the corrected ambient temperature value from the previous states. If the collected value is less than the stored value, the method of 500 proceeds to element 590 via path 574, where the stored value is updated with the collected value and the method return to element 565 for further iterations. Otherwise, if the collected value is not less than the stored value, the method maintains the corrected value and returns to block 565. In this manner, the stored ambient temperature value is only updated if the temperature decreases.

Figure 6:
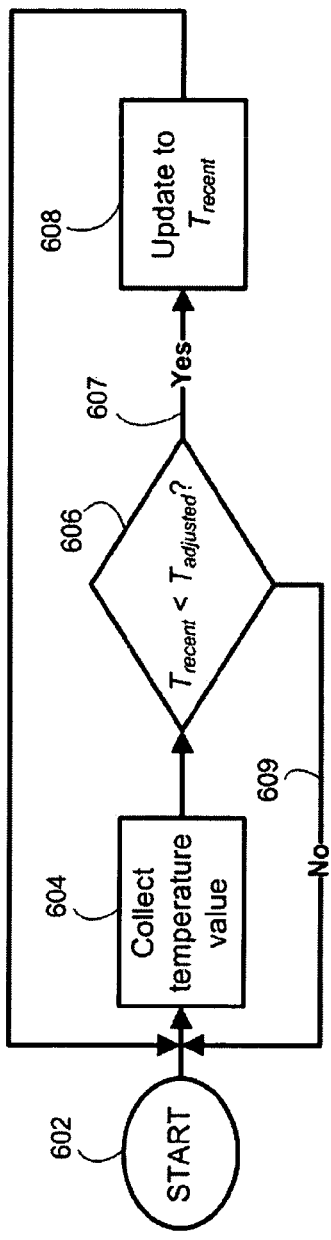

Referring now to FIG. 6, the method of flow chart 600 corresponds to state 330 of FIG. 3 and may accordingly be implemented when the vehicle exceeds a threshold speed. As shown, the method starts at block 602 and proceeds to block 604 where an ambient temperature value is collected using the OAT sensor. Next, at decision element 606 the (recent temperature value) is compared to the stored ambient temperature value. The stored value may be the (adjusted temperature value) from the previous states. If the collected temperature value is less than the stored value, the method proceeds to element 608 via path 607 where the stored value is updated with the newly collected value. Otherwise, path 607 is followed to block 604 where the process is iteratively repeated. Of course, path 607 may include a suitable time delay to allow for sufficiently spaced apart sampling intervals.

Figure 7:
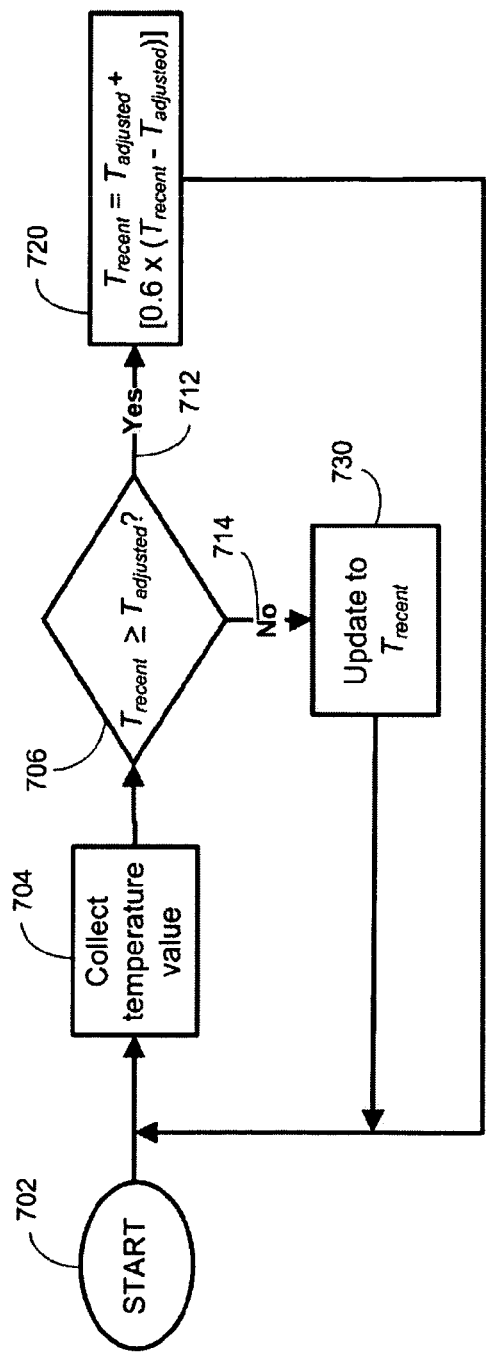

Referring now to FIG. 7, the method of flow chart 700 corresponds to state element 340 of FIG. 3 and may be accordingly implemented when the vehicle exceeds a threshold speed. Starting at block 702, the method proceeds to block 704 where an ambient temperature value is collected using the OAT sensor. Next, at decision element 706, the (recent temperature value) is compared to the stored ambient temperature value. The stored ambient temperature value may be the (adjusted temperature value) from the previous states. If the collected value is greater than or equal to the stored value, the method proceeds via path 712 to element 720 where the stored value is updated as an expression of the previously stored value and the collected value. Next, from element 720, the method proceeds to element 704 where the process is iteratively repeated.

Referring back to decision element 706, if the newly collected temperature value is less than the stored value, the method proceeds to element 730 via path 714 where the stored value is updated with the collected value. From element 730, the method proceeds to element 704 where the process is iteratively repeated.

Figure 8:
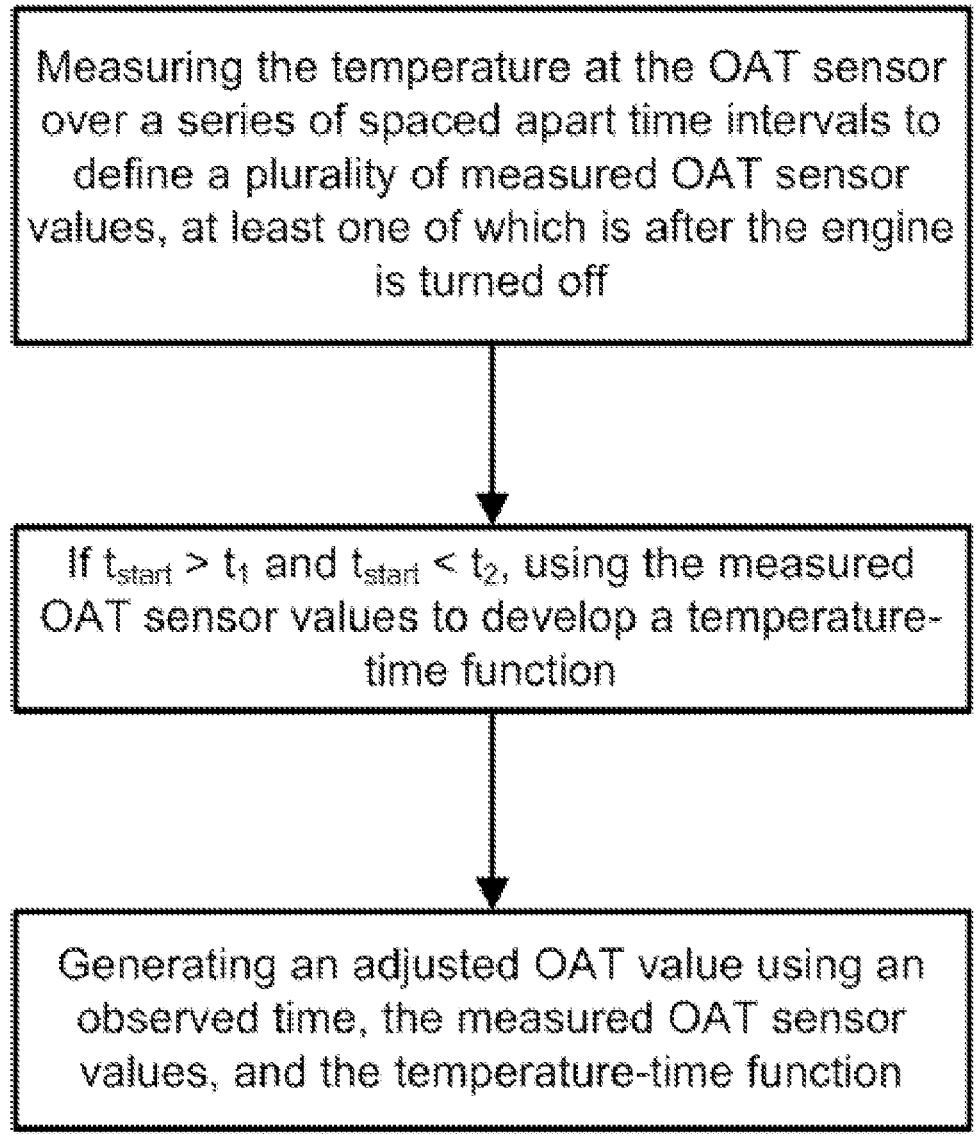
FIG. 8 shows a block diagram illustrating a summarized method for determining and correcting vehicle ambient temperature in accordance with embodiments of the present invention.

FIG. 8 provides a block diagram which generally illustrates the method of determining and correcting ambient air temperature in the presence of undesired heat adjacent to the OAT sensor. Each step may be encoded on any suitable computer readable medium as instructions. The computer readable medium may be, for example, non-volatile memory in a controller unit.

While the best mode for carrying out the invention has been described in detail, those familiar with the art to which this invention relates will recognize various alternative designs and embodiments for practicing the invention as defined by the following claims.

What is claimed is:

1. A method of determining air temperature outside a passenger compartment of a motor vehicle, the motor vehicle having an engine and an outside air temperature (OAT) sensor disposed outside the passenger compartment, the OAT sensor in a region which is exposed to heat after the engine is turned off, the method comprising:
    measuring the temperature with the OAT sensor over a series of spaced apart time intervals to define a plurality of measured OAT sensor values, at least one of which is after the engine is turned off, wherein the measured OAT values define a most recent value;
    using the measured OAT sensor values to extrapolate a temperature-time function;
    generating an adjusted OAT value using an observed time, the measured OAT sensor values, and the temperature-time function; and
    applying a correction strategy when the vehicle is traveling at a speed at or above a threshold speed to determine the adjusted OAT value, wherein the step of applying a correction strategy further comprises:
        updating the adjusted OAT value to the most recent value when the most recent value is less than the adjusted OAT value; and
        setting the adjusted OAT value as a function of the most recent value and the adjusted OAT value when the most recent value is greater than or equal to the adjusted OAT value.

2. The method of claim 1 wherein at least one of the OAT sensor values is measured before the engine is turned off.

3. The method of claim 1 wherein at least one of the OAT sensor values is measured before the engine is turned off.

4. The method of claim 1, wherein the adjusted OAT value is generated upon starting the engine when the engine is turned off for a time period less than a predetermined maximum time interval.

5. The method of claim 4, wherein the correction formula is $$T_{adjusted} = A * e^{(-B*t)} + C$$

where:
    $T_{adjusted}$ is the adjusted temperature value at time t, and A, B, and C are values determined from the regression analysis.

6. The method of claim 1 wherein the measured OAT sensor values define a most recent value, the method further comprising the step of applying a correction strategy when the vehicle is traveling at a speed below a threshold speed to determine the adjusted temperature value.

7. The method of claim 6 wherein the step of applying a correction strategy further comprises updating the adjusted value to the most recent value when the most recent value is less than the adjusted value.

8. The method of claim 1 wherein the function of the most recent temperature value and the adjusted value is $$T_{adjusted} = T_{adjusted} + [k*(T_{recent} - T_{adjusted})]$$

where:
    $T_{adjusted}$ is the adjusted temperature value, k is a proportional constant, and $T_{recent}$ is the most recent temperature value.

9. A method of determining air temperature outside a passenger compartment of a motor vehicle, the motor vehicle having an engine and an outside air temperature (OAT) sensor disposed outside the passenger compartment, the OAT sensor in a region which is exposed to heat after the engine is turned off, the method comprising:
    measuring the temperature with the OAT sensor over a series of spaced apart time intervals to define a plurality of measured OAT sensor values, at least one of which is after the engine is turned off;
    using the measured OAT sensor values to extrapolate a temperature-time function; and
    generating an adjusted OAT value using an observed time, the measured OAT sensor values, and the temperature-time function, wherein the adjusted OAT value is generated upon starting the engine when the engine is turned off for a time period less than a predetermined maximum time interval.

10. The method of claim 9 wherein the measured OAT sensor values define a most recent value, the method further comprising the step of applying a correction strategy when the vehicle is traveling at a speed at or above a threshold speed to determine the adjusted temperature value.

11. The method of claim 10 wherein the step of applying a correction strategy further comprises updating the adjusted value to the most recent value when the most recent value is less than the adjusted value.

12. The method of claim 11 wherein the step of applying a correction strategy further comprises setting the adjusted value as a function of the most recent temperature value and the adjusted value when the most recent value is greater than or equal to the adjusted value.

13. The method of claim 12 wherein the function of the most recent temperature value and the adjusted value is:

$$T_{adjusted} = T_{adjusted} + [k*(T_{recent} - T_{adjusted})]$$

where:
    $T_{adjusted}$ is the adjusted temperature value, k is a proportional constant; and
    $T_{recent}$ is the most recent temperature value.

14. A system for determining air temperature outside a passenger compartment of a motor vehicle, the system comprising:
    an outside air temperature (OAT) sensor located outside a motor vehicle passenger compartment, the OAT sensor in a region which is exposed to heat after the engine is turned off; and
    a controller having a computer readable medium having instructions encoded thereon for:
        measuring the temperature with the OAT sensor over a series of spaced apart time intervals to define a plurality of measured OAT sensor values, at least one of which is after the engine is turned off
        using the measured OAT sensor values to extrapolate a temperature-time function; and
        generating an adjusted OAT value using an observed time, the measured OAT sensor values, and the temperature-time function, wherein the adjusted OAT value is generated upon starting the engine when the engine is turned off for a time period less than a predetermined maximum time interval.

15. The system of claim 14 wherein at least one of the OAT sensor values is measured before the engine is turned off.

16. The system of claim 15, wherein the adjusted OAT value is generated using a correction formula based on a regression analysis.

17. The system of claim 14 wherein the measured OAT sensor values define a most recent value, the system further comprising an instruction encoded on the computer readable medium for applying a correction strategy when the vehicle is traveling at a speed below a threshold speed to determine the adjusted temperature value.

18. The system of claim 17 wherein the instruction for applying a correction strategy further comprises updating the adjusted value to the most recent value when the most recent value is less than the adjusted value.

19. The system of claim 14 wherein the measured OAT sensor values define a most recent value, the system further comprising an instruction encoded on the computer readable medium for applying a correction strategy when the vehicle is traveling at a speed at or above a threshold speed to determine the adjusted temperature value.

20. The system of claim 19 wherein the instruction for applying a correction strategy further comprises updating the adjusted value to the most recent value when the most recent value is less than the adjusted value.

* * * * *